No. 891,444. PATENTED JUNE 23, 1908.
R. C. SCHERLING.
COTTON PICKING MACHINE.
APPLICATION FILED FEB. 21, 1907.
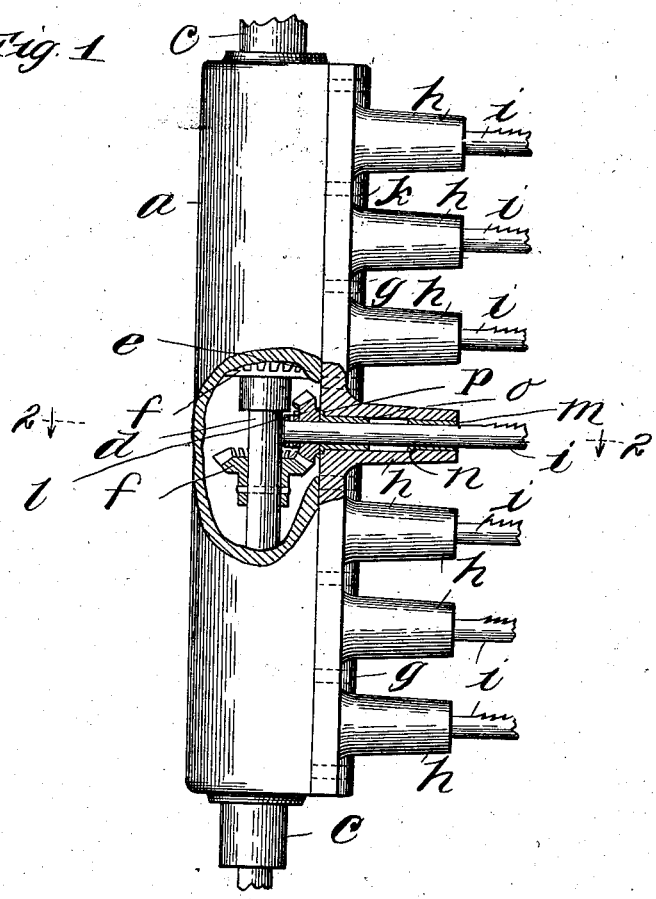
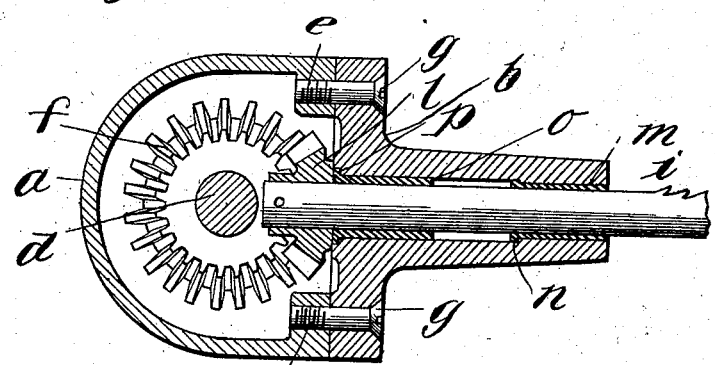
Witnesses
Inventor
Rudolph C. Scherling
By

UNITED STATES PATENT OFFICE.

RUDOLPH C. SCHERLING, OF CHICAGO, ILLINOIS, ASSIGNOR TO HENRY E. BULLOCK AND JAMES E. BULLOCK, OF CHICAGO, ILLINOIS.

COTTON-PICKING MACHINE.

No. 891,444.      Specification of Letters Patent.      Patented June 23, 1908.

Application filed February 21, 1907. Serial No. 358,547.

*To all whom it may concern:*

Be it known that I, RUDOLPH C. SCHERLING, citizen of the United States, residing at Chicago, in the county of Cook and State of Illinois, have invented a certain new and useful Improvement in Cotton-Picking Machines, of which the following is a full, clear, concise, and exact description, reference being had to the accompanying drawings, forming a part of this specification.

My invention relates to cotton picking machines, and relates particularly to the picker columns entering into the construction of such machines.

It is well known that picker columns comprise each a support for the fingers' bearings, an operating shaft carried in said support, gear wheels provided upon said shaft, and picker fingers carried by the bearings and projecting inwardly at their bases into proximity with the gear wheels and carrying gear wheels meshing with the aforesaid gear wheels. The portions of the support carrying the bearings and the operating shaft, have hitherto been made integral, rendering it extremely difficult to replace fingers which frequently break, the breakage very often occurring close to the bearings.

It is one object of my invention to provide a construction whereby the portions or bases of the fingers within the bearings may readily be removed from the bearings, to which end I make the portion of the support that carries the operating shaft distinct from that portion of the support which carries the bearings, and separably unite these two support portions, whereby when a finger is to be removed and replaced the support portions may be separated and reunited for the purpose.

In the preferred embodiment of my invention, the two support portions are made of cast iron, the shaft supporting portion having a semi-cylindrical wall portion substantially concentric with said shaft and two parallel wall portions forming continuations of the semi-cylindrical wall portion, while the companion support section is in the form of a plate secured to marginal enlargements of the aforesaid parallel wall portions by means of screws passing through said plate into said marginal enlargements. The bosses are integrally formed with this plate and project at right angles to the operating shaft and the plane of the plate, said shaft and plate being parallel, strengthening webs intervening between the bosses and also cast integrally therewith. The bosses are provided with bores whose axes extend at right angles to the shaft.

It is another object of my invention to provide improved bearings for the picking fingers whereby frictional wear upon the bosses projecting from the picker support is avoided, to which end the bores in the bosses are enlarged to receive liners, preferably of antifriction metal, that afford the direct bearing supports for the fingers. There are desirably two such liners or bearing sleeves for each boss, one at each end of the corresponding boss.

Each outer bearing sleeve has its inner end terminating in an outwardly extending flange, the bore of the boss being of one diameter to receive the major portion of the bearing sleeve and of a larger diameter to permit the sleeve with its flanged head to be forced through the bore from the base of the boss toward the tip until said flanged head encounters the shoulder formed between the different portions of the bore. Another bearing sleeve of a diameter equal to the larger portion of the bore is forced into the bore at the base portion of the boss, this latter sleeve also desirably having a flanged head received in an annular enlargement of the bore, the gear wheel upon the inner end of the cotton picking finger desirably closely engaging or approaching the said latter flange to hold the latter sleeve in position in the event of its looseness. I also desirably form the picker column so that it will retain lubricating oil or other liquid within its interior, whereby said oil may be supplied in sufficient quantity to the bearings carrying the picker columns.

I will explain my invention more fully by reference to the accompanying drawing, illustrating the preferred embodiment of the invention, in which—

Figure 1 is an elevation of so much of a picker column as is essential to an understanding of my invention, a portion of the mechanism being broken away to reveal clearly certain details of construction. Fig. 2 is a sectional view on line 2 of Fig. 1.

Like parts are indicated by similar characters of reference in both figures.

The column support is formed in two sections *a b*, the section *a* being provided with bearings $c\ c$ for the operating shaft $d$ to which motion is imparted in any suitable and well known way. The portion $a$ of the support is desirably made semi-cylindrical at the rear portion and is made with two parallel continuations of said semi-cylindrical portion, which parallel continuations terminate in marginal enlargements $e\ e$. The operating shaft $d$ is provided with bevel gear wheels $f$, there being one wheel $f$ to operate each cotton picking finger. The support section $b$ is in the form of a plate that is fastened in position by means of screws $g$ passing through the plate into said marginal enlargements. This plate is provided with as many bosses $h$ as there are cotton picking fingers $i$, each boss $h$ being elevated or displaced a sufficient distance from the associate wheel $f$ to permit of suitable gearing connection, as will appear. The bosses $h$ are desirably formed in an integral casting with the plate $b$ and have webs $k$ intervening between the same for strengthening purposes, said webs $k$ being also desirably formed in the same casting. The picking fingers project through the bores in the bosses and each finger carries a wheel $l$ on its inner end that meshes with the wheel $f$, it being understood that the wheels $l$ are fixed to the fingers $i$ and that the wheels $f$ are fixed to the shaft $d$. The wheels are within the gear casing formed by the elements $a\ b$. Each boss preferably has its bore formed of differing diameters, the smallest diameter being at the tip of the boss, the largest diameter being at the base of the boss, while the third diameter is intermediate between these two.

A sleeve $m$, composed preferably of Babbitt metal, is provided with a flange $n$, said sleeve being inserted from the base of the boss, said flange limiting the extent to which it may be moved. Another sleeve $o$, also preferably composed of Babbitt metal, is provided with a flange $p$, this sleeve being inserted into the bore of the boss from the base of the boss, the flange $p$ limiting the extent to which said sleeve may be inserted within the bore. The fit of the sleeves $m\ o$ is preferably snug or tight, and the flanges $n$ and $p$ further serve to hold said sleeves in position, while the gear $l$ serves further to prevent the displacement of the sleeve $o$ as said gear $l$ butts closely against the flange $p$.

By the provision of the sleeves $m\ o$, direct frictional wear of the picking fingers upon the bosses is avoided, and whenever the sleeves $m\ o$ are sufficiently worn, they may readily be replaced. By this arrangement the bosses $h$ are not worn out, so that the life of the picker column is not likely to become shortened by reason of undue wear upon the bosses.

The two parts $a\ b$ of the support are desirably so formed and said parts are so constructed that lubricating oil may be contained in the casing formed thereby, whereby the gear wheels within said casing are thoroughly immersed in the lubricating oil and the bearings for the picker fingers are supplied with the oil, which lubricating oil desirably finds access to the annular spaces between the liners $o$ and $m$ as well as between said liners $o$ and $m$ and the bases of the picking fingers.

I believe that I am the first to provide hollow traveling columns for picker fingers in cotton picking machines that are adapted to contain lubricating oil or other liquid.

Having thus described my invention, I claim as new and desire to secure by Letters-Patent:

1. In a cotton picking machine, the combination with a picker operating shaft, a plurality of picking fingers in gear therewith, and a support for said shaft and picking fingers formed in two separable sections, one section bearing the shaft and the other section bearing the picking fingers.

2. In a cotton picking machine, the combination with a picker operating shaft, a plurality of picking fingers in gear therewith, and a support for said shaft and picking fingers formed in two separable sections, one section bearing the shaft and the other section bearing the picking fingers, the section bearing the picking fingers being provided with bosses having bores that afford the bearings for the fingers.

3. In a cotton picking machine, the combination with a picker operating shaft, a plurality of picking fingers in gear therewith, and a support for said shaft and picking fingers formed in two separable sections, one section bearing the shaft and the other section bearing the picking fingers, said sections having screws for effecting their separable union.

4. In a cotton picking machine, the combination with a picker operating shaft, a plurality of picking fingers in gear therewith, and a support for said shaft and picking fingers formed in two separable sections, one section bearing the shaft and the other section bearing the picking fingers, the section bearing the picking fingers being provided with bosses having bores that afford the bearings for the fingers, said sections having screws for effecting their separable union.

5. In a cotton picking machine, the combination with a picker operating shaft, a plurality of picking fingers in gear therewith, and a support for said shaft and picking fingers formed in two separable sections, one section bearing the shaft and the other section bearing the picking fingers, the gearing that establishes the connection between the picking fingers and the said shaft comprising bevel gear wheels upon the shaft and bevel gear wheels upon the fingers.

6. In a cotton picking machine, the combination with a picker operating shaft, a plurality of picking fingers in gear therewith, and a support for said shaft and picking fingers formed in two separable sections, one section bearing the shaft and the other section bearing the picking fingers, the gearing that establishes the connection between the picking fingers and the said shaft comprising bevel gear wheels upon the shaft and bevel gear wheels upon the fingers, the section bearing the picking fingers being provided with bosses having bores that afford the bearings for the fingers.

7. In a cotton picking machine, the combination with a picker operating shaft, a plurality of picking fingers in gear therewith, and a support for said shaft and picking fingers formed in two separable sections, one section bearing the shaft and the other section bearing the picking fingers, said sections having screws for effecting their separable union, the gearing that establishes the connection between the picking fingers and the said shaft comprising bevel gear wheels upon the shaft and bevel gear wheels upon the fingers.

8. In a cotton picking machine, the combination with a picker operating shaft, a plurality of picking fingers in gear therewith, and a support for said shaft and picking fingers formed in two separable sections, one section bearing the shaft and the other section bearing the picking fingers, the section bearing the picking fingers being provided with bosses having bores that afford the bearings for the fingers, said sections having screws for effecting their separable union, the gearing that establishes the connection between the picking fingers and the said shaft comprising bevel gear wheels upon the shaft and bevel gear wheels upon the fingers.

In witness whereof, I hereunto subscribe my name this 16th day of February A. D., 1907.

RUDOLPH C. SCHERLING.

Witnesses:
LEON G. STROH,
G. L. CRAGG.